(12) United States Patent
Seo

(10) Patent No.: US 7,444,072 B2
(45) Date of Patent: Oct. 28, 2008

(54) STAGE APPARATUS AND CAMERA SHAKE CORRECTION APPARATUS USING STAGE APPARATUS

(75) Inventor: Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 294 days.

(21) Appl. No.: 11/175,156

(22) Filed: Jul. 7, 2005

(65) Prior Publication Data

US 2006/0007320 A1    Jan. 12, 2006

(30) Foreign Application Priority Data

Jul. 9, 2004    (JP)    ............... 2004-203632

(51) Int. Cl.
  G03B 17/00    (2006.01)
  B23Q 1/62    (2006.01)
  G02B 27/64    (2006.01)
(52) U.S. Cl. .................. 396/55; 33/1 M; 359/554; 108/20; 108/143
(58) Field of Classification Search .................. 396/55, 396/52–54; 348/208.99, 208.2, 208.5, 208.7, 348/208.11; 359/554, 557, 813, 814; 33/1 M; 74/490.08, 490.09, 490.13; 108/20, 143
See application file for complete search history.

(56) References Cited

U.S. PATENT DOCUMENTS

2003/0067544 A1 * 4/2003 Wada ................ 348/208.7
2005/0157287 A1    7/2005 Seo ..................... 355/72
2005/0185057 A1    8/2005 Seo .................. 348/208.4
2005/0204640 A1    9/2005 Seo ........................ 52/7

FOREIGN PATENT DOCUMENTS

JP    8-152659    6/1996
JP    8-304868    11/1996

OTHER PUBLICATIONS

English Language Abstract of JP 8-152659.

* cited by examiner

*Primary Examiner*—Rochelle-Ann Blackman
(74) *Attorney, Agent, or Firm*—Greenblum & Bernstein, P.L.C.

(57) ABSTRACT

A stage apparatus includes a stationary support plate; a Y-direction movable member supported on, and parallel to, the stationary support plate so as to be relatively movable in a Y-direction, the Y-direction movable member including a Y-direction rod portion and a pair of X-direction rod portions, wherein the Y-direction rod portion extends in the Y-direction, and the pair of X-direction rod portions are joined to the Y-direction rod portion to extend in an X-direction both parallel to the stationary support plate and perpendicular to the Y-direction; and an X-direction movable member supported by the pair of X-direction rod portions to be movable in the X-direction relative to the Y-direction movable member. At least one of the pair of X-direction rod portions is rotatable about an axis of the Y-direction rod portion relative to the Y-direction rod portion.

24 Claims, 11 Drawing Sheets

STAGE APPARATUS AND CAMERA SHAKE CORRECTION APPARATUS USING STAGE APPARATUS

BACKGROUND OF THE INVENTION

1. Field of the Invention

The present invention relates to a stage apparatus which moves a movable stage in two orthogonal directions in a plane, and a camera shake correction apparatus using the stage apparatus.

2. Description of the Prior Art

A known stage apparatus used as a camera shake correction apparatus in which a movable stage is moved in two orthogonal directions in a plane is described in, for example, Japanese laid-open patent publications H8-304868 and H8-152659.

Such a known stage apparatus (shake correction apparatus) has a structure which will be discussed hereinafter. Namely, a Y-direction guide member which projects from one of opposite surfaces of a stationary support plate (stationary support base-plate) is provided with a Y-direction linear slot which is elongated in a specific direction (Y-direction), and one of the two rod portions of a Y-direction movable rod (Y-direction movable member), which are angled relative to each other to have the shape of a letter L, is slidably engaged in the Y-direction linear slot so that the Y-direction movable rod is linearly guided in the Y-direction. A projecting portion which projects from a movable stage (X-direction movable member) to which a correction lens is fixed is provided with an X-direction linear slot which is elongated in an X-direction orthogonal to the Y-direction, and the other of the aforementioned two rod portions of the Y-movable rod is slidably engaged in the X-direction linear slot so that the movable stage is linearly guided in the X-direction by the other rod portion of the Y-direction movable rod. In addition, front and rear surfaces of the movable stage are supported at three points thereon by positioning members so that the movable stage remains lying in a plane (X-Y imaginary plane) parallel to both the X- and Y directions.

If an actuator gives the above-described movable stage a linear moving force in the X-direction, the movable stage linearly moves in the X-direction in the X-Y imaginary plane along the aforementioned other rod portion of the Y-direction movable rod. If the actuator gives the movable stage a linear moving force in the Y-direction, the aforementioned one rod portion of the Y-direction movable rod linearly moves in the Y-direction in the X-Y imaginary plane along the Y-direction linear slot, which causes the movable stage to move together linearly in the Y-direction.

Accordingly, the correction lens is moved in the X and Y directions to correct camera shake (i.e., to stabilize an object image which is to be photographed) by driving the actuator in accordance with shake information detected by a shake detection sensor provided in a camera.

However, the structure of the stage apparatus disclosed in Japanese laid-open patent publications H8-304868 is complicated because the stage apparatus needs to be provided with positioning members which support front and rear surfaces of the movable stage at three points in addition to the stationary support plate, the Y-direction movable member and the movable stage (X-direction movable member).

To overcome such a problem, the assignee of the present invention has proposed a stage apparatus which includes: a stationary support plate; a Y-direction movable member which is supported on the stationary support plate to be movable in a specific Y-direction; and an X-direction movable member (movable stage) which is supported on the Y-direction movable member to be movable in an X-direction orthogonal to the Y-direction, wherein the Y-direction movable member includes a Y-direction rod portion which extends in the Y-direction and a pair of X-direction rod portions which are connected to the Y-direction rod portion and extend in the X-direction, the stationary support plate includes a Y-direction guide device for guiding the Y-direction rod portion of the Y-direction movable member so as to slide in the Y-direction, and a Y-direction support device for supporting free ends of the pair of X-direction rod portions so as to allow movement of each X-direction rod portion in the Y-direction, and the X-direction movable member is supported by the Y-direction movable member so as to slide in the X-direction. This stage apparatus is disclosed in Japanese Patent Application 2004-13563.

In this stage apparatus, if all the Y-direction rod portion and the pair of X-direction rod portions of the Y-direction movable member do not lie in one plane, the Y-direction movable member cannot move smoothly relative to the stationary support plate while the movable stage (X-direction movable member) cannot move in the X-direction smoothly relative to the Y-direction movable member either, which deteriorates the operating characteristics of the stage apparatus.

Nevertheless, it is generally the case that the Y-direction movable member is molded as a single member, and it is not easy for the Y-direction movable member to be molded so that all of the Y-direction rod portion and the pair of X-direction rod portions of the Y-direction movable member lie in one plane with a high degree of precision. Moreover, it is difficult to make all of the Y-direction rod portion and the pair of X-direction rod portions of the Y-direction movable member lie in one plane after the completion of molding of the Y-direction movable member by adjusting the angle between the axis of the Y-direction rod portion and the axis of each X-direction rod portion.

SUMMARY OF THE INVENTION

The present invention provides a stage apparatus having a structure enabling the Y-direction rod portion and the pair of X-direction rod portions of either the Y-direction movable member or the X-direction movable member to be positioned so as to lie in one plane in an easy manner, and also provides a camera sake correction apparatus using such a stage apparatus.

According to an aspect of the present invention, a stage apparatus is provided, including a stationary support plate; a Y-direction movable member supported on, and parallel to, the stationary support plate so as to be relatively movable in a Y-direction, the Y-direction movable member including a Y-direction rod portion and a pair of X-direction rod portions, wherein the Y-direction rod portion extends in the Y-direction, and wherein the pair of X-direction rod portions are joined to the Y-direction rod portion to extend in an X-direction both parallel to the stationary support plate and perpendicular to the Y-direction; and an X-direction movable member supported by the pair of X-direction rod portions to be movable in the X-direction relative to the Y-direction movable member. At least one of the pair of X-direction rod portions is rotatable about an axis of the Y-direction rod portion relative to the Y-direction rod portion.

It is desirable for the stationary support plate to include at least one Y-direction guide portion having a Y-direction guide hole in which the Y-direction rod portion is slidably engaged to be guided in the Y-direction; and a pair of free-end support portions having a pair of Y-direction elongated holes, respectively, in which free ends of the pair of X-direction rod portions are engaged to be freely movable in the Y-direction and which prevents the pair of X-direction rod portions from rotating about the Y-direction rod portion, respectively.

It is desirable for the X-direction movable member to include at least one X-direction guide portion having an X-direction guide hole in which one of the pair of X-direction rod portions is engaged so that the X-direction guide portion is linearly guided in the X-direction; and at least one support portion having a rotation limit hole in which the other of the pair of X-direction rod portions is engaged so that the support portion is movable in the X-direction relative to the other of the pair of X-direction rod portions without rotating about the one of the pair of X-direction rod portions.

It is desirable for the Y-direction rod portion and at least one of the pair of X-direction rod portions to be provided as separate members which are joined to each other via a joint so that the one X-direction rod portion is rotatable about the axis of the Y-direction rod portion.

It is desirable for the joint to have at least one support hole in which at least one of the pair of X-direction rod portions and the Y-direction rod portion is engaged to be rotatable relative to the joint.

It is desirable for the support hole to be formed as a through-hole which extends through the joint. One end portion of the one of the pair of X-direction rod portions and the Y-direction rod portion extends through the joint through the support hole. A retainer member having a diameter greater than an inner diameter of the through-hole is fixed to an end of the one end portion which projects out of the through-hole.

It is desirable for the stage apparatus to include a Y-direction actuator which drives the Y-direction movable member in the Y-direction; and an X-direction actuator which drives the X-direction movable member in the X-direction.

The stage apparatus can be incorporated in a camera, wherein the camera includes an image pickup device fixed to a front surface of the X-direction movable member so that an image pickup surface of the image pickup device is located on an image plane of a photographing optical system of the camera; a camera shake detection sensor which detects camera shake of the camera; and a controller for driving at least one of the Y-direction actuator and the X-direction actuator in accordance with the camera shake detected by the camera shake detection sensor to stabilize an object image which is formed on the image pickup device through the photographing optical system.

It is desirable for the stage apparatus to be incorporated in a camera, wherein the camera includes a correction lens fixed to the X-direction movable member to be positioned in front of an image plane of a photographing optical system of the camera, wherein an optical axis of the correction lens substantially coincides with an optical axis of the photographing optical system; a camera shake detection sensor which detects camera shake of the camera; and a controller for driving at least one of the Y-direction actuator and the X-direction actuator in accordance with the camera shake detected by the camera shake detection sensor to stabilize an object image which is formed on the image pick-up device through the photographing optical system and the correction lens.

The joint can be an L-shaped joint.

It is desirable for each of the Y-direction actuator and the X-direction actuator to be an electromagnetic actuator.

It is desirable for the stationary support plate to be positioned perpendicular to an optical axis of the photographing optical system.

It is desirable for the stationary support plate to be positioned perpendicular to the optical axis of the photographing optical system.

It is desirable for the Y-direction movable member to have a substantially U-shape.

It is desirable for the rotation limit hole of the support portion to be formed as a groove elongated in the X-direction through the support portion. A length of the groove in the Y-direction is greater than a diameter of the other of the pair of X-direction rod portions, and a width of the groove in a forward/rearward direction of the stage apparatus is substantially the same as the diameter of the other of the pair of X-direction rod portions.

In an embodiment, a stage apparatus is provided, including a stationary support plate; an X-direction movable member supported on, and parallel to, the stationary support plate so as to be relatively movable in an X-direction, the X-direction movable member including a pair of X-direction rod portions and a Y-direction rod portion, wherein the pair of X-direction rod portions extend in the X-direction, and wherein the Y-direction rod portion is joined to the pair of X-direction rod portions and extends in a Y-direction both parallel to the stationary support plate and perpendicular to the X-direction; and a Y-direction movable member supported by the pair of X-direction rod portions to be movable in the Y-direction relative to the X-direction movable member. At least one of the pair of X-direction rod portions is rotatable about an axis of the Y-direction rod portion relative to the Y-direction rod portion.

It is desirable for the stationary support plate to include at least one X-direction guide portion having an X-direction guide hole in which one of the pair of X-direction rod portions is slidably engaged to be guided in the X-direction; and at least one support portion having a Y-direction elongated hole in which the other of the pair of X-direction rod portions is engaged to be freely movable in the X-direction and which prevents the other of the pair of X-direction rod portions from rotating about the one of the pair of X-direction rod portions.

It is desirable for the Y-direction movable member to include at least one Y-direction guide portion having a Y-direction guide hole in which the Y-direction rod portion is engaged so that the Y-direction guide portion is linearly guided in the Y-direction; and at least one support portion having a rotation limit hole in which at least one of the pair of X-direction rod portions is engaged so that the support portion is movable in the Y-direction relative to the one of the pair of X-direction rod portions without rotating about the Y-direction rod portion.

It is desirable for the Y-direction rod portion and at least one of the pair of X-direction rod portions to be provided as separate members which are joined to each other via a joint so that the one X-direction rod portion is rotatable about the axis of the Y-direction rod portion.

It is desirable for the joint to have at least one support hole in which at least one of the pair of X-direction rod portions and the Y-direction rod portion is engaged to be rotatable relative to the joint.

It is desirable for the support hole to be formed as a through-hole which extends through the joint. One end portion of the one of the pair of X-direction rod portions and the Y-direction rod portion extends through the joint through the support hole. A retainer member having a diameter greater than an inner diameter of the through-hole is fixed to an end of the one end portion which projects out of the through-hole.

It is desirable for the stage apparatus to include a Y-direction actuator which drives the Y-direction movable member in the Y-direction; an X-direction actuator which drives the X-direction movable member in the X-direction.

It is desirable for the stage apparatus to be incorporated in a camera, wherein the camera includes an image pickup device fixed to a front surface of the Y-direction movable member so that an image pickup surface of the image pickup device is located on an image plane of a photographing optical system of the camera; a camera shake detection sensor which detects camera shake of the camera; an a controller for driving at least one of the Y-direction actuator and the X-direction actuator in accordance with the camera shake detected by the camera shake detection sensor to stabilize an object image which is formed on the image pickup device through the photographing optical system.

It is desirable for the stage apparatus to be incorporated in a camera, wherein the camera includes a correction lens fixed to the Y-direction movable member to be positioned in front of an image plane of a photographing optical system of the camera, wherein an optical axis of the correction lens substantially coincides with an optical axis of the photographing optical system a camera shake detection sensor which detects camera shake of the camera; and a controller for driving at least one of the Y-direction actuator and the X-direction actuator in accordance with the camera shake detected by the camera shake detection sensor to stabilize an object image which is formed on the image pick-up device through the photographing optical system and the correction lens.

According to the present invention, the operating characteristics of the stage apparatus are improved because the Y-direction rod portion and the pair of X-direction rod portions of either the Y-direction movable member or the X-direction movable member can be easily positioned to lie on a common plane simply by rotating at least one of the pair of X-direction rod portions relative to the Y-direction rod portion to adjust the angle (rotational angle) therebetween.

The present disclosure relates to subject matter contained in Japanese Patent Application No. 2004-203632 (filed on Jul. 9, 2004) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

A first embodiment of a camera shake correction apparatus (image stabilizer) according to the present invention will be hereinafter discussed with reference to FIGS. 1 through 15. The camera shake correction apparatus 5 is incorporated in a digital camera 1 as shown in FIG. 1.

Figure 1:
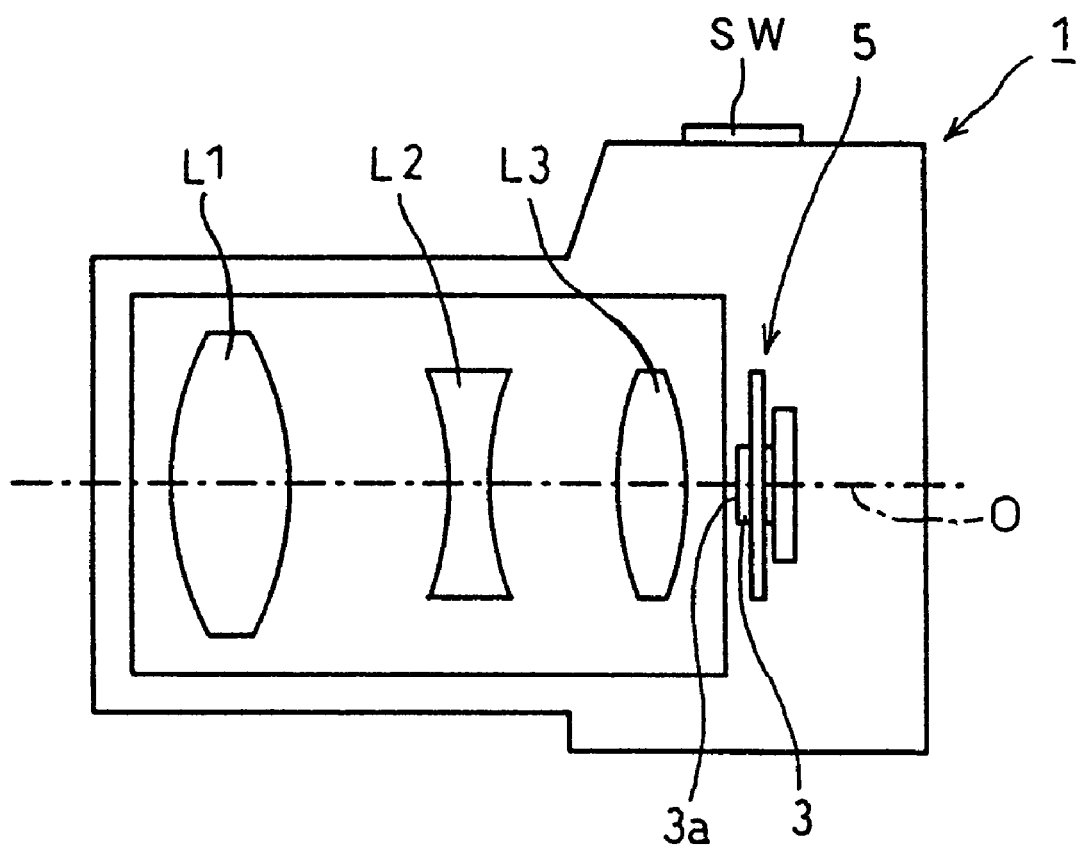
FIG. 1 is a longitudinal sectional view of a digital camera which incorporates a first embodiment of a camera shake correction apparatus according to the present invention.

As shown in FIG. 1, the digital camera 1 is provided therein with a photographing optical system including a plurality of lenses L1, L2 and L3. A CCD image sensor (image pickup device) 3 is provided behind the lens L3. The CCD image sensor 3 is provided with an image pickup surface 3a which is perpendicular to an optical axis O of the photographing optical system and is located on an image plane of the photographing optical system. The CCD image sensor 3 is secured to the camera shake correction apparatus 5 that is incorporated in the digital camera 1.

The camera shake correction apparatus 5 is constructed as described in the following description with reference to FIGS. 2 through 15.

Figure 2:
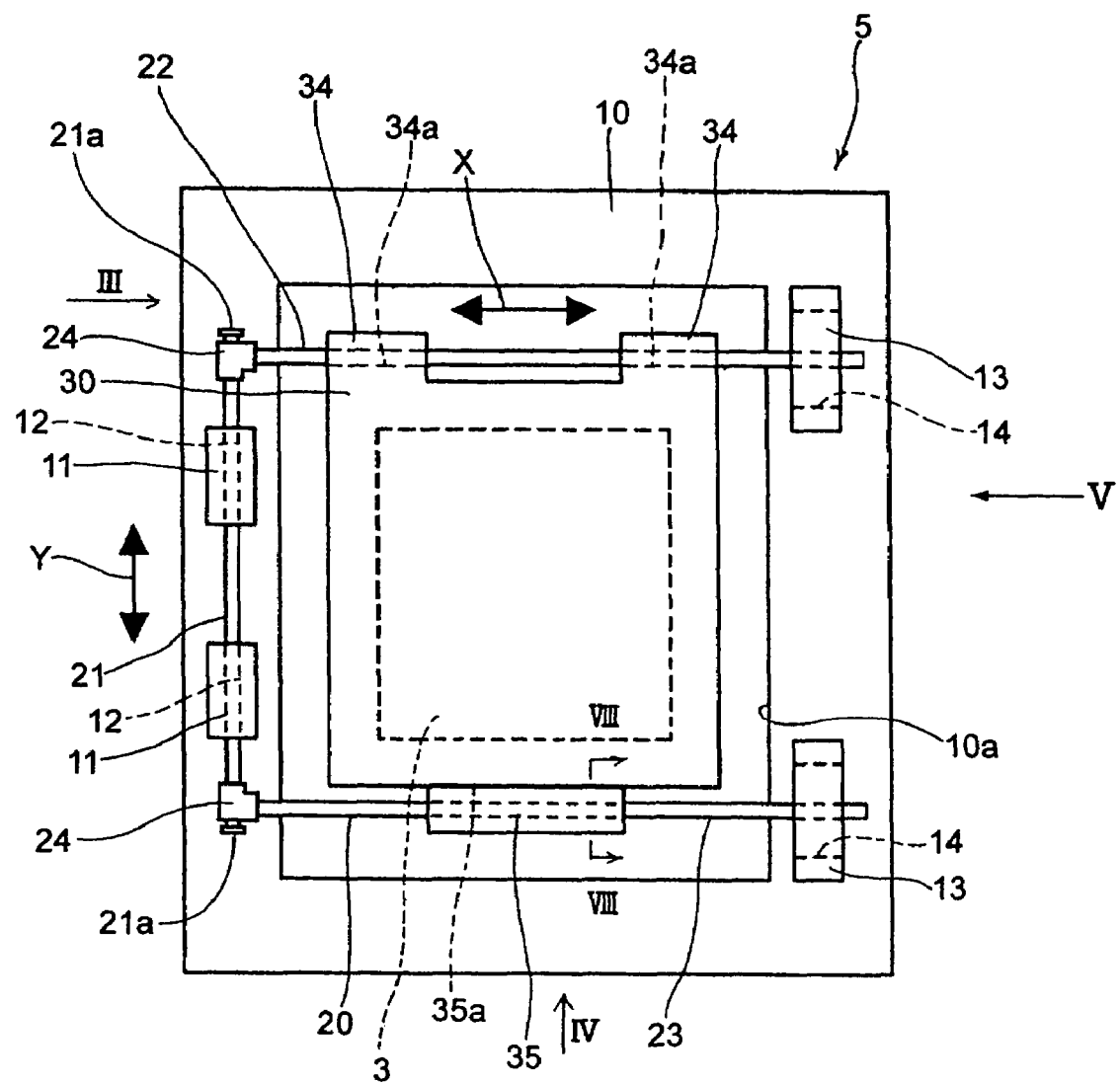
FIG. 2 is a rear elevational view of the camera shake correction apparatus in an inoperative state, wherein an electric circuit board, two yoke members and magnets are not shown for clarity.
Figure 3:
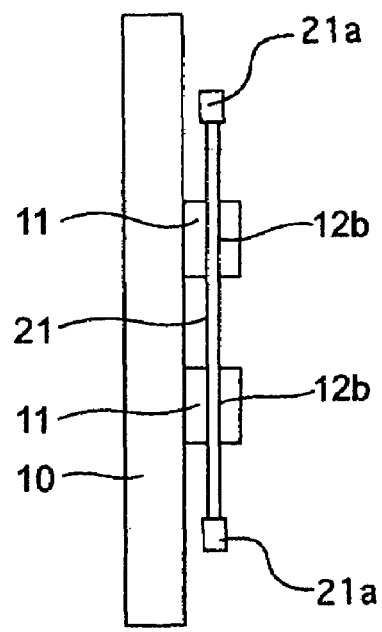
FIG. 3 is a side elevational view of the camera shake correction apparatus, viewed in the direction of an arrow III shown in FIG. 2, wherein the movable stage thereof is removed for clarity.
Figure 6:
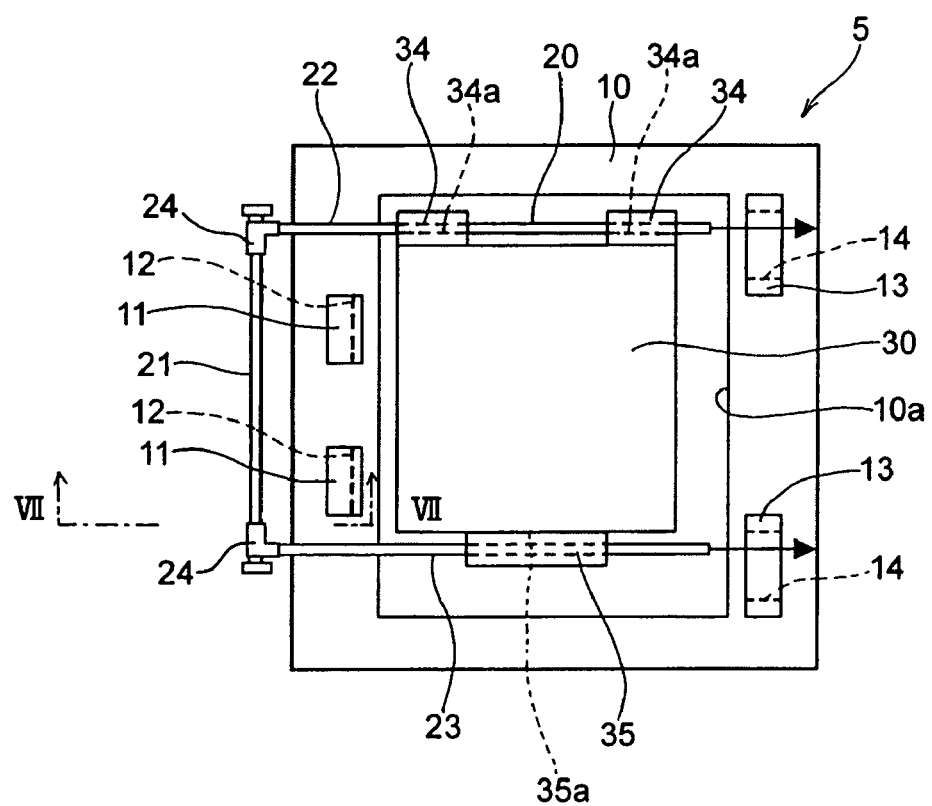
FIG. 6 is a rear elevational view of the camera shake correction apparatus during an assembling process thereof, wherein a CCD image sensor, the electric circuit board, the two yoke members and the magnets are not shown for clarity.
Figure 7:
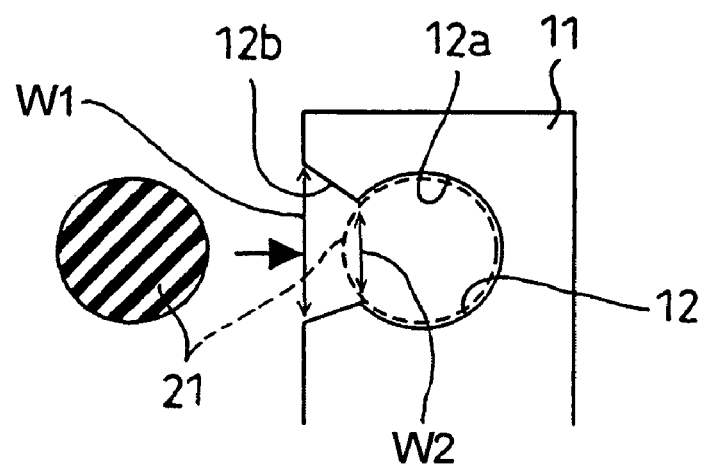
FIG. 7 is a cross sectional view taken along VII-VII line shown in FIG. 6, showing a state where a stage support member is about to be engaged in a guide portion of a Y-direction guide portion formed on a stationary support plate.
Figure 9:
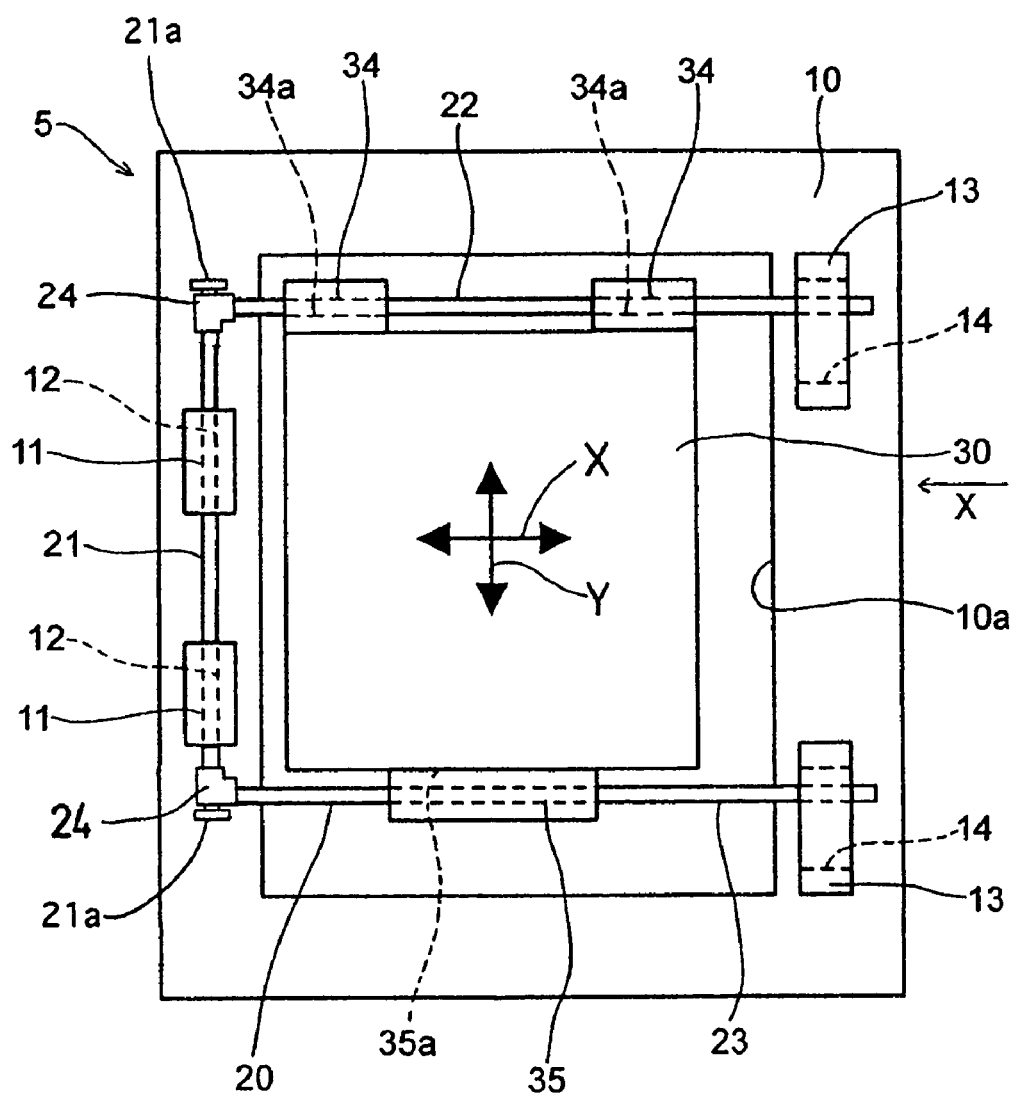
FIG. 9 is a rear elevational view of the camera shake correction apparatus in an operative state, wherein the CCD image sensor, the electric circuit board, the two yoke members and the magnets are not shown for clarity.
Figure 10:
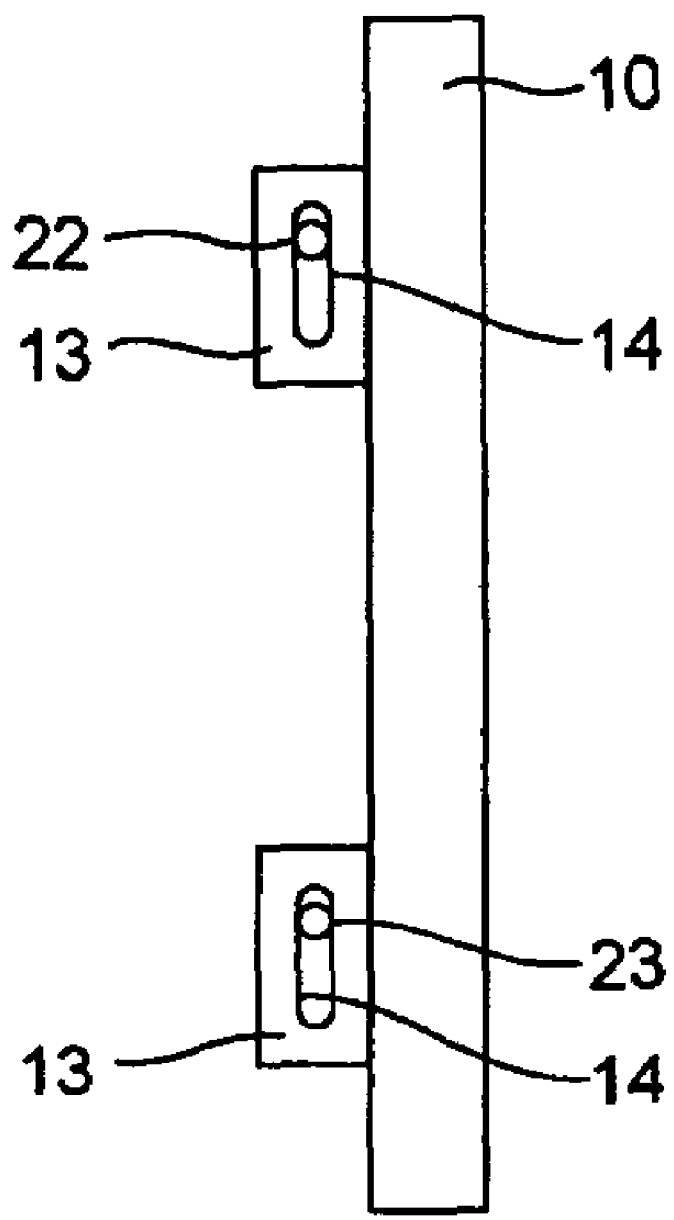
FIG. 10 is a side elevational view of the camera shake correction apparatus, viewed in the direction of an arrow X shown in FIG. 9, wherein the movable stage is removed for clarity.

As shown in FIGS. 2, 6 and 9, the camera shake correction apparatus 5 is provided with a stationary support plate (stationary member) 10 which is square in shape when viewed from the rear thereof. The stationary support plate 10 is provided in a central portion thereof with a square receiving hole 10a. The stationary support plate 10 is secured to the body of the digital camera 1 by a securing device (not shown) so that the stationary support plate 10 is positioned perpendicular to the optical axis O and that the optical axis O passes through the center of the receiving hole 10a. The stationary support plate 10 is provided, on a rear surface thereof in the vicinity of the left end of the stationary support plate 10, with a pair of Y-direction guide portions 11 which are formed from a resilient material such as a compound resin, etc., and have the same shape and size. The pair of Y-direction guide portions 11 project from the rear surface of the stationary support plate 10 to be aligned in a Y-direction (vertical direction as viewed in FIG. 2) shown by an arrow Y in FIG. 2, and are provided with a pair of Y-direction guide grooves 12 which linearly extend through the pair of Y-direction guide portions 11 in the Y-direction to be aligned in the Y-direction, respectively. As shown in FIG. 7, each Y-direction guide groove 12 is provided with a guide portion 12a and an opening portion 12b. The guide portion 12a is circular in cross section, and the opening portion 12b communicatively connects the guide portion 12a with the outside of the Y-direction guide portions 11. The guide portions 12a of the pair of Y-direction guide grooves 12 are coaxially aligned in the Y-direction, and a width (W1) of the outer end (left end as viewed in FIG. 7) of each opening portion 12b is greater than a width (W2) of the inner end (right end as viewed in FIG. 7) thereof.

The stationary support plate 10 is provided, on a rear surface thereof in the vicinity of the right end of the stationary support plate 10, with a pair of free-end support portions 13 having the same shape and size. The pair of free-end support portions 13 project from the rear surface of the stationary support plate 10 to be aligned in the Y-direction, and each free-end support portion 13 is provided with a Y-direction-elongated through-hole 14 which is formed to extend through the free-end support portion 13 in an X-direction (horizontal direction as viewed in FIG. 2) shown by an arrow X in FIG. 2 and to be elongated in the Y-direction. The axes of the Y-direction-elongated through-holes 14 of the pair of free-end support portions 13, which extend in the X-direction, and the common axis of the guide portions 12a of the Y-direction guide grooves 12, which extends in the Y-direction, all lie on a common plane parallel to the stationary support plate 10.

Figure 15:
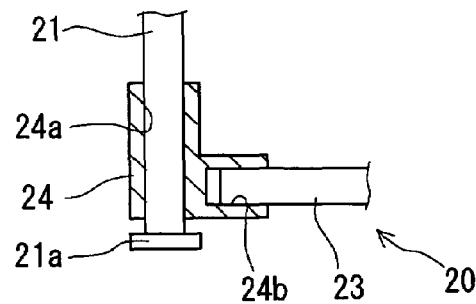
FIG. 15 is an enlarged cross sectional view of a connected portion between a Y-direction rod portion and an X-direction rod portion.

The camera shake correction apparatus 5 is provided with a Y-direction movable member 20 which is made of three metal rods which are joined together to have a U-shape as shown in FIGS. 2, 6 and 9. Each metal rod is circular in cross section. More specifically, the Y-direction movable member 20 is provided with a Y-direction rod portion 21 which extends in the Y-direction, and two X-direction rod portions 22 and 23 which extend in the X-direction (horizontal direction as viewed in FIGS. 2, 6 and 9), which is perpendicular to the Y-direction. An upper end of the Y-direction rod portion 21 and a left end of the upper X-direction rod portion 22 are joined to each other by a joint (upper joint) 24, while a lower end of the Y-direction rod portion 21 and a left end of the lower X-direction rod portion 23 are joined to each other by another joint (lower joint) 24. Each joint 24 is in the form of a substantially letter L as viewed from the rear side of the camera shake correction apparatus 5, and is made of synthetic resin. As shown in FIG. 15, each joint 24 is provided with a Y-direction through-hole (support hole) 24a which extends in the Y-direction, and an X-direction bottomed hole (support hole) 24b which extends in the X-direction. The left end of the upper X-direction rod portion 22 is fitted into the X-direction bottomed hole 24b of the associated joint 24 to be fixed thereto so as not to rotate relative to the associated joint 24, while the left end of the lower X-direction rod portion 23 is fitted into the X-direction bottomed hole 24b of the associated joint 24 to be fixed thereto so as not to rotate relative to the associated joint 24. The upper end of the Y-direction rod portion 21 is fitted into the Y-direction through-hole 24a of the associated joint 24 to be rotatable relative thereto, while the lower end of the Y-direction rod portion 21 is fitted into the Y-direction through-hole 24a of the associated joint 24 to be rotatable relative thereto. Two retainer disks (retainer portions) 21a each having a diameter greater than the diameter of the Y-direction through-hole 24a of the associated joint 24 are fixed to the upper and lower ends of the Y-direction rod portion 21 after the upper and lower ends of the Y-direction rod portion 21 are inserted into the Y-direction through-holes 24a of the upper and lower joints 24, respectively. Each retainer disk 21a prevents the associated end of the Y-direction rod portion 21 from coming off the Y-direction through-hole 24a of the associated joint 24. The cross sectional shapes of the Y-direction rod portion 21 and the guide portion 12a of each Y-direction guide groove 12 are substantially the same. The diameter of each X-direction rod portion 22 and 23 is substantially the same as the width of the Y-direction-elongated through-hole 14 of the associated free-end support portion 13 in the forward/rearward direction of the camera shake correction apparatus 5, i.e., in a direction perpendicular to the X and Y directions, and is smaller than the length of the Y-direction-elongated through-hole 14 of the associated free-end support portion 13 in the Y-direction.

Figure 12:
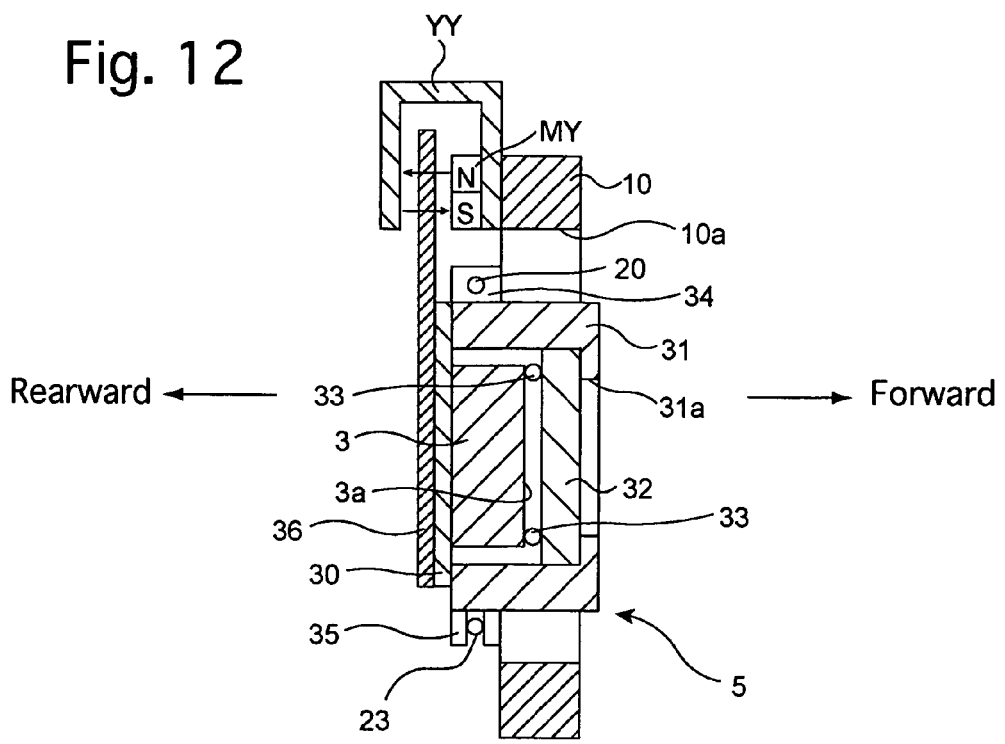
FIG. 12 is a cross sectional view taken along XII-XII line shown in FIG. 11.

The camera shake correction apparatus 5 is provided with a base plate (an element of an X-direction movable member) 30 having a substantially square shape as viewed from the rear of the camera shake correction apparatus 5, and the CCD image sensor 3 is fixed to a front surface of the base plate 30. As shown in FIG. 12, the camera shake correction apparatus 5 is provided with a hollow cover member (an element of the X-direction movable member) 31 which is fixed to the front surface of the base plate 30 to surround the CCD image sensor 3. The cover member 31 is provided on a front wall thereof with an aperture 31a having a square shape as viewed from the front of the camera shake correction apparatus 5. The aperture 31a is formed on the cover member 31 so that an image pickup surface 3a of the CCD image sensor 3, which is fixed to the front surface of the base plate 30, is entirely exposed through the aperture 31a as viewed from the front of the camera shake correction apparatus 5. Furthermore, a low-pass filter 32 made of a transparent material is provided in the cover member 31 so that the outer edge of the low-pass filter 32 abuts against a front portion of an inner peripheral surface of the cover member 31. A retainer member 33 having a rectangular annular shape in a front elevation is sandwiched between the periphery of the image pickup surface 3a of the CCD image sensor 3 and the rear surface of the low-pass filter 32.

Figure 8:
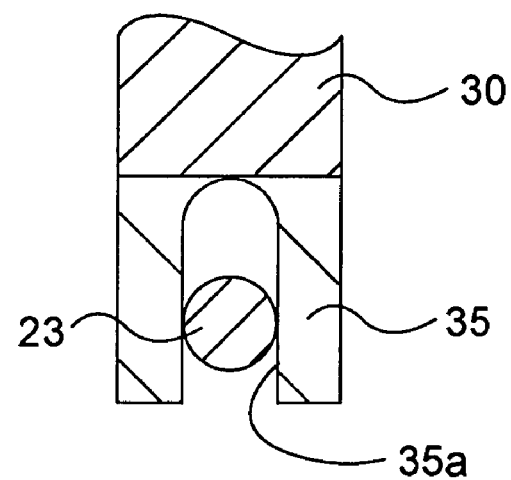
FIG. 8 is a cross sectional view taken along VIII-VIII line shown in FIG. 2.

The cover member 31 is provided at an upper end thereof with a pair of X-direction guide portions (elements of the X-direction movable member) 34 which project upwards to be laterally spaced from each other, and is further provided at a lower end of the cover member 31 with a support portion (an element of the X-direction movable member) 35 which projects downwards. The pair of X-direction guide portions 34 are provided with a pair of X-direction guide holes 34a, respectively, which are formed as through-holes extending in the X-direction to be aligned in the X-direction. A cross sectional shape of each X-direction guide hole 34a is substantially the same as a cross sectional shape of the upper X-direction rod portion 22. On the other hand, the support portion 35 is provided with a support groove (rotation limit hole) 35a which extends through the support portion 35 in the X-direction. As shown in FIG. 8, the lower end of the support groove 35a is formed as an open end at the lower end of the support portion 35. The length of the support groove 35a in the Y-direction is greater than the diameter of the X-direction rod portion 23, and the width of the support groove 35a in the forward/rearward direction (horizontal direction as viewed in FIG. 8) of the camera shake correction apparatus 5 is substantially the same as the diameter of the X-direction rod portion 23. A common axis of the X-direction guide holes 34*a* of the pair of X-direction guide portions 34 and an axis of the support groove 35*a*, which extends in the X-direction, al lie on a common plane.

Figure 11:
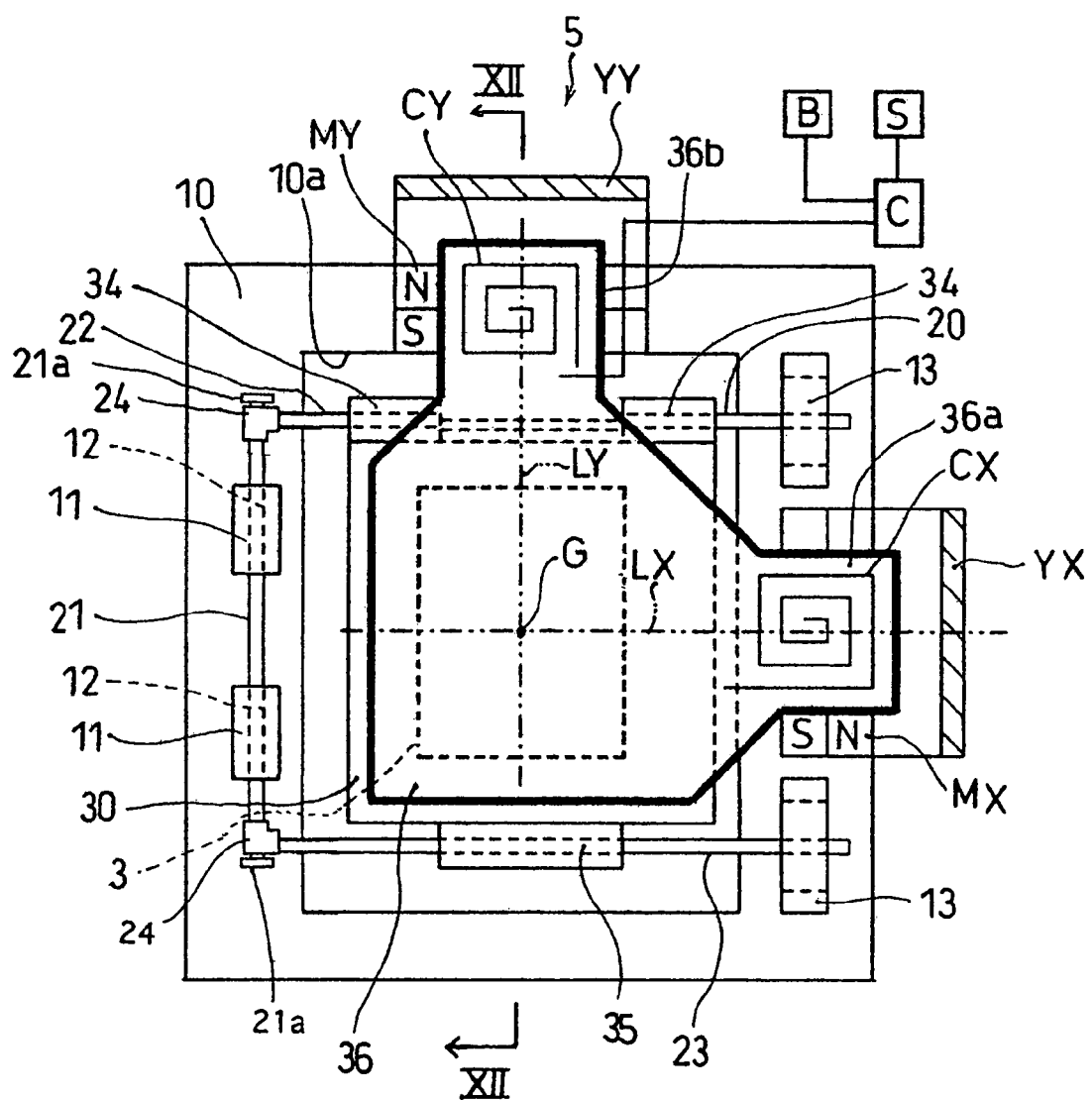
FIG. 11 is a rear elevational view of the camera shake correction apparatus in an inoperative state, wherein portions of the two yoke members are shown in cross section for clarity.

As shown in FIGS. 11 and 12, the camera shake correction apparatus 5 is provided with an electric circuit board 36 which is secured to the rear surface of the base plate 30. The circuit board 36 is provided with a large number of conductor wires (not shown) to which the CCD image sensor 3 is electrically connected. The circuit board 36 is provided with two projecting tongues 36*a* and 36*b*, the rear surfaces of which a planar X-direction drive coil (coil actuator) CX and a planar Y-direction drive coil (coil actuator) CY are printed, respectively. The X-direction drive coil CX and the Y-direction drive coil CY lie in a plane parallel to the circuit board 36.

Figure 13:
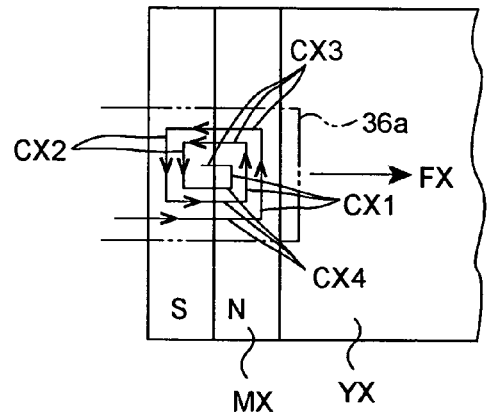
FIG. 13 is an enlarged schematic view of an X-direction driving system.

As shown in FIG. 13, the X-direction drive coil CX is rectangularly coiled and is defined by linear right sides CX1, linear left sides CX2, linear upper sides CX3 and linear lower sides CX4.

Figure 14:
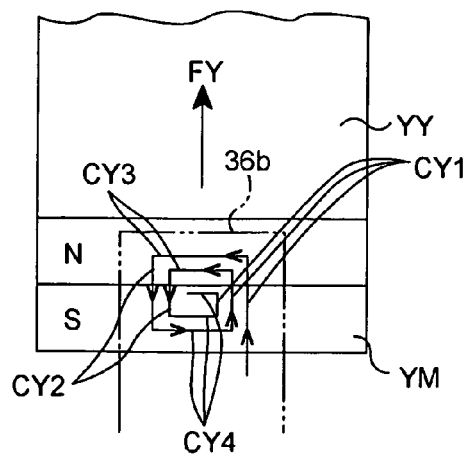
FIG. 14 is an enlarged schematic view of a Y-direction driving system.

As shown in FIG. 14, the Y-direction drive coil CY is rectangularly coiled and is defined by linear right sides CY1, linear left sides CY2, linear upper sides CY3 and linear lower sides CY4. Although the X-direction drive coil CX and the Y-direction drive coil CY have several turns in the drawings, it is desirable for the X-direction drive coil CX and the Y-direction drive coil CY to each have a few dozen turns.

Each end of the X-direction drive coil CX and each end of the Y-direction drive coil CY are electrically connected to the conductor wires of the circuit board 36. Furthermore, as viewed from the rear of the camera shake correction apparatus 5, an imaginary X-direction line LX, which linearly extends in the X-direction and passes through the center of the X-direction drive coil CX, substantially passes through the center of gravity G of an X-direction movable block including the circuit board 36, the base plate 30, the cover member 31, the low-pass filter 32, the retainer member 33 and the CCD image sensor 3 as shown in FIG. 11. On the other hand, as viewed from the rear of the camera shake correction apparatus 5, an imaginary Y-direction line LY, which linearly extends in the Y-direction and passes through the center of the Y-direction drive coil CY, substantially passes through the center of gravity of a Y-direction movable block including the aforementioned X-direction movable block and the Y-direction movable member 20 in an inoperative state shown in FIG. 11 (more specifically, the imaginary Y-direction line LY passes through a point which slightly deviates from the center of gravity of the Y-direction movable block).

The camera shake correction apparatus 5 is provided with two yoke members: an X-direction yoke member YX and a Y-direction yoke member YY which are secured to the rear surface of the stationary support plate 10. The two yoke members YX and YY are made of a soft magnetic material such as metal, and are U-shaped in cross section. The two yoke members YX and YY are provided with an X-direction magnet MX and a Y-direction magnet MY which are secured to inner surfaces of the two yoke members YX and YY, respectively. The magnet MX of the yoke member YX includes an N-pole and an S-pole which are aligned in the X-direction, and the magnet MY of the yoke member YY includes an N-pole and an S-pole which are aligned in the Y-direction.

As shown in FIG. 12, the rear end of the yoke member YY is opposed to the magnet MY to form a magnetic circuit, together with the magnet MY.

Likewise, the rear end of the yoke member YX forms a magnetic circuit, together with the magnet MX, though such a magnetic circuit is not shown in the drawings.

In a state where the cover member 31 is positioned in the receiving hole 10*a* of the stationary support plate 10 and where the two projecting tongues 36*a* and 36*b* of the circuit board 36 are positioned inside of the two yoke members YX and YY, respectively, if the Y-direction movable member 20 is made to approach the cover member 31 from the left-hand side of the camera shake correction apparatus 5 as viewed in FIGS. 2, 6, 9 and 11, if the upper X-direction rod portion 22 is made to pass through the pair of X-direction guide holes 34*a* of the pair of X-direction guide portions 34, and further if the lower X-direction rod portion 23 is made to pass through the support groove 35*a* of the support portion 35, the circuit board 36 becomes movable in the X-direction relative to the Y-direction movable member 20.

Thereafter, as shown in FIG. 6, the Y-direction movable member 20, which is integral with the pair of X-direction guide portions 34, the support portion 35 and the circuit board 36, is linearly moved from the left-hand side to the right-hand side of the camera shake correction apparatus 5 as viewed in FIG. 6 to make free ends of the two X-direction rod portions 22 and 23 engaged in the Y-direction-elongated through-holes 14 of the pair of free-end support portions 13, respectively, and at the same time, the Y-direction rod portion 21 is brought into engagement with the opening portions 12*b* of the pair of Y-direction guide grooves 12. Bringing the Y-direction rod portion 21 into engagement with the opening portions 12*b* of the pair of Y-direction guide grooves 12 on the pair of Y-direction guide portions 11 causes the pair of Y-direction guide portions 11 to be resiliently deformed to widen the opening portions 12*b* because the diameter of the Y-direction rod portion 21 is greater than the width W2 of the inner end of each opening portion 12*b* though smaller than the width W1 of the outer end of each opening portion 12*b*. Further moving the Y-direction rod portion 21 rightward as viewed in FIG. 6 causes the Y-direction rod portion 21 to be firmly engaged in the guide portions 12*a* of the pair of Y-direction guide grooves 12 while the pair of Y-direction guide portions 11 resiliently return to their original shapes to complete the assembly of the camera shake correction apparatus 5 as shown in FIGS. 11 and 12.

Accordingly, the Y-direction movable member 20 can be easily engaged in the Y-direction-elongated through-holes 14 of the pair of free-end support portions 13 and the pair of Y-direction guide grooves 12 of the Y-direction guide portions 11 simply by moving the Y-direction movable member 20 linearly from the left-hand side to the right-hand side of the camera shake correction apparatus 5 as viewed in FIGS. 2, 6 and 9. Moreover, the Y-direction movable member 20 can be easily disengaged from the Y-direction-elongated through-holes 14 of the pair of free-end support portions 13 and the pair of Y-direction guide grooves 12 of the Y-direction guide portions 11 simply by moving the Y-direction movable member 20 linearly from the right-hand side to the left-hand side of the camera shake correction apparatus 5 as viewed in FIGS. 2, 6 and 9 by only a force which is sufficiently capable of resiliently deforming the pair of Y-direction guide portions 11 to widen the opening portions 12*b*. Accordingly, the Y-direction movable member 20 is supported on the stationary support plate 10 via the Y-direction guide portions 11 and free-end support portions 13 so as to be relatively movable in the Y-direction parallel to the stationary support plate 10.

Figure 4:
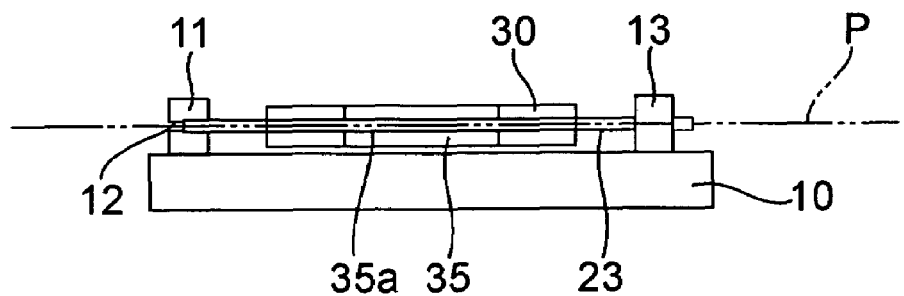
FIG. 4 is an underside view of the camera shake correction apparatus, viewed in the direction of an arrow IV shown in FIG. 2.
Figure 5:
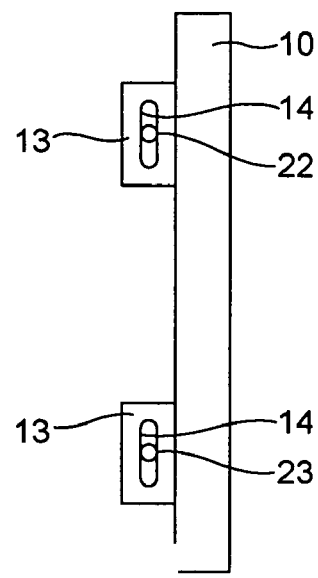
FIG. 5 is a side elevational view of the camera shake correction apparatus, viewed in the direction of an arrow V shown in FIG. 2, wherein the movable stage is removed for clarity.

The Y-direction movable member 20 is prevented from rotating about the Y-direction rod portion 21 since the diameter of each X-direction rod portion 22 and 23 is substantially the same as the width of the Y-direction-elongated through-hole 14 of the associated free-end support portion 13 in the forward/rearward direction of the camera shake correction apparatus 5 as noted above. As a result, the axis of the Y-direction rod portion 21 and the axes of the X-direction rod portions 22 and 23 lie in an X-Y imaginary plane P (see FIG. 4), which is parallel to the X-Y directions, at all times. Additionally, the pair of Y-direction guide portions 11, the pair of free-end support portions 13 and the base plate 30 lie in the X-Y imaginary plane P as shown in FIG. 4.

As shown in FIG. 11, the digital camera 1 is provided with a battery B, a camera shake detection sensor S for detecting camera shake of the digital camera 1, and a control circuit (controller) C which supplies the electric power of the battery B to the drive coils CX and CY while varying the direction and magnitude thereof in accordance with shake information detected by the camera shake detection sensor S. The battery B and the camera shake detection sensor S are electrically connected to the control circuit C which is electrically connected to the conductor wires of the circuit board 36.

The above described components of the camera shake correction apparatus 5 other than the battery B, the shake detection sensor S and the control circuit C constitute a stage apparatus of the camera shake correction apparatus 5.

The magnet MX and the yoke member YX constitute an X-direction magnetic-force generator. The magnet MY and the yoke member YY constitute a Y-direction magnetic-force generator. The X-direction magnetic-force generator and the X-direction drive coil CX constitute an X-direction actuator. The Y-direction magnetic-force generator and the Y-direction drive coil CY constitute a Y-direction actuator.

The camera shake correction apparatus 5 operates as follows.

In a photographing operation carried out by the digital camera 1, light transmitted through the lenses L1 through L3 is converged onto the image pickup surface 3a of the CCD image sensor 3 through the receiving hole 10a and the low-pass filter 32 to form an image on the image pickup surface 3a. If a camera shake correction switch SW (shown in FIG. 1) of the digital camera 1 is ON during the photographing operation, the shake detection sensor S does not detect the camera shake when no camera shake (image movement) of the digital camera 1 occurs. Consequently, the camera shake correction apparatus 5 is maintained in an inoperative position as shown in FIGS. 2 through 5, and 11. If a camera shake of the digital camera 1 occurs when the camera shake correction switch is ON, the shake detection sensor S detects the camera shake, and the shake information is supplied to the control circuit C. As a result, the control circuit C supplies electric current generated in the battery B to the X-direction drive coil CX and the Y-direction drive coil CY while adjusting the direction and the magnitude of the electric current.

The cover member 31, to which the circuit board 36 is fixed via the base plate 30, is movable in the X-direction within a predetermined moving range in which the cover member 31 does not contact the receiving hole 10a and the linear right sides CX1 of the X-direction drive coil CX remains opposed to the N-pole of the magnet MX while the linear left sides CX2 of the X-direction drive coil CX remains opposed to the S-pole of the magnet MX in the optical axis direction.

In an inoperative state shown in FIG. 11 of the camera shake correction apparatus 5, if the electric current is supplied to the X-direction drive coil CX in the direction indicated by the arrows in FIG. 13, a rightward linear force FX in the X-direction is produced in the linear right sides CX1 and the linear left sides CX2 as shown in FIG. 13. Since the rightward linear force FX causes the pair of X-direction guide portions 34 and the support portion 35 of the cover member 31 to move rightward along the two X-direction rod portions 22 and 23, the circuit board 36 also moves rightward relative to the stationary support plate 10. Note that forces are produced in the linear upper sides CX3 and the linear lower sides CX4 during such a rightward movement of the circuit board 36; however, these forces cancel each other out and are not applied to the circuit board 36.

When electric current in a direction opposite to the arrows shown in FIG. 13 is supplied to the X-direction drive coil CX, linear forces toward the left in the X-direction are produced in the linear right sides CX1 and the linear left sides CX2, the circuit board 36 moves leftward relative to the stationary support plate 10 along the two X-direction rod portions 22 and 23.

By adjusting the direction of the electric current supplied to the X-direction drive coil CX by the control circuit C in the above described manner, the circuit board 36 moves in the X-direction (lateral direction) within the predetermined moving range in which the cover member 31 does not contact the receiving hole 10a and the linear right sides CX1 of the X-direction drive coil CX remains opposed to the N-pole of the magnet MX while the linear left sides CX2 of the X-direction drive coil CX remains opposed to the S-pole of the magnet MX in the optical axis direction.

Moreover, as soon as the supply of the current from the battery B to the X-direction drive coil CX is stopped, the movement of the circuit board 36 is stopped due to absence of the force in the X-direction.

Since the magnitude of the current to be supplied to the X-direction drive coil CX is proportional to the magnitude of the force in the X-direction which is produced by the current supplied to the X-direction drive coil CX, the force FX that is applied to the X-direction drive coil CX is increased or reduced by increasing or reducing the current supplied to the X-direction drive coil CX from the battery B.

On the other hand, the cover member 31, to which the circuit board 36 is fixed via the base plate 30, is movable in the Y-direction within a predetermined moving range in which the cover member 31 does not contact the receiving hole 10a and the linear upper sides CY3 of the Y-direction drive coil CY remains opposed to the N-pole of the magnet MY while the linear lower sides CY4 of the Y-direction drive coil CY remains opposed to the S-pole of the magnet MY in the optical axis direction.

In an inoperative state shown in FIG. 11 of the camera shake correction apparatus 5, if the electric current is supplied to the Y-direction drive coil CY in the direction indicated by the arrows in FIG. 14, the upward linear force FY in the Y-direction is produced in the linear upper sides CY3 and the linear lower sides CY4 as shown in FIG. 14. Since the upward linear force FY causes the Y-direction movable member 20 to move upward along the pair of Y-direction guide grooves 12 and the Y-direction-elongated through-holes 14, the circuit board 36 also moves upward relative to the stationary support plate 10. Note that forces are produced in the linear right sides CY1 and the linear left sides CY2 during such an upward movement of the circuit board 36; however, these forces cancel each other out and are not applied to the circuit board 36.

When electric current in a direction opposite to the arrows shown in FIG. 14 is supplied to the Y-direction drive coil CY, linear forces downward in the Y-direction are produced in the linear upper sides CY3 and the linear lower sides CY4, the circuit board 36 moves downward relative to the stationary support plate 10 along the pair of Y-direction guide grooves 12 and the Y-direction-elongated through-holes 14.

By adjusting the direction of the electric current supplied to the Y-direction drive coil CY by the control circuit C in the above described manner, the circuit board 36 moves in the Y-direction (vertical direction), along the pair of Y-direction guide grooves 12 and the Y-direction-elongated through-holes 14, within the predetermined moving range in which the cover member 31 does not contact the receiving hole 10*a* and the linear upper sides CY3 of the Y-direction drive coil CY remains opposed to the N-pole of the magnet MY while the linear lower sides CY4 of the Y-direction drive coil CY remains opposed to the S-pole of the magnet MY in the optical axis direction.

Moreover, as soon as the supply of the current from the battery B to the Y-direction drive coil CY is stopped, the movement of the circuit board 36 is stopped due to absence of the force in the Y-direction.

Since the magnitude of the current to be supplied to the Y-direction drive coil CY is proportional to the magnitude of the force in the Y-direction which is produced by the current supplied to the Y-direction drive coil CY, the force FY that is applied to the Y-direction drive coil CY is increased or reduced by increasing or reducing the current supplied to the Y-direction drive coil CY from the battery B.

Accordingly, camera shake can be corrected by varying the position of the CCD image sensor 3, which is fixed to the base plate 30, in the X and Y directions in accordance with movement of the circuit board 36 in the X and Y directions.

In the stage apparatus discussed above, the Y-direction movable member 20 can be easily constructed because it is assembled simply by joining easily-moldable three rod portions (the Y-direction rod portion 21 and the two X-direction rod portions 22 and 23) together via the two joints 24. Moreover, the Y-direction rod portion 21 and the two X-direction rod portions 22 and 23 can be easily positioned on a common plane by adjusting the rotational angle of the two X-direction rod portions 22 and 23 relative to the Y-direction rod portion 21 because the two X-direction rod portions 22 and 23 are rotatable relative to the Y-direction rod portion 21 about the axis thereof via the two joints 24. Therefore, the Y-direction movable member 20 can move smoothly relative to the stationary support plate 10, and also the X-direction movable member (the base plate 30, the cover member 31, the pair of X-direction guide portions 34 and the support portion 35) can move smoothly relative to the Y-direction movable member 20, which improves the operating characteristics of the camera shake correction apparatus 5 that uses the above described Y-direction movable member 20.

Moreover, the force produced in the X-direction drive coil CX is effectively transmitted to the circuit board 36 because the imaginary X-direction line LX substantially passes through the center of gravity G of the X-direction movable block (which consists of the circuit board 36, the base plate 30, the cover member 31, the low-pass filter 32, the retainer member 33 and the CCD image sensor 3) in the forward/rearward direction of the camera shake correction apparatus 5, while the force produced in the Y-direction drive coil CY is effectively transmitted to the circuit board 36 because the imaginary Y-direction line LY substantially passes through the center of gravity of the Y-direction movable block (which consists of the aforementioned X-direction movable block and the Y-direction movable member 20) in an inoperative state of the camera shake correction apparatus 5 and further because the imaginary Y-direction line LY substantially passes through the center of gravity of the Y-direction movable block even after the center of gravity thereof slightly moves in the X-direction by a movement of the circuit board 36 in the X-direction.

Figure 16:
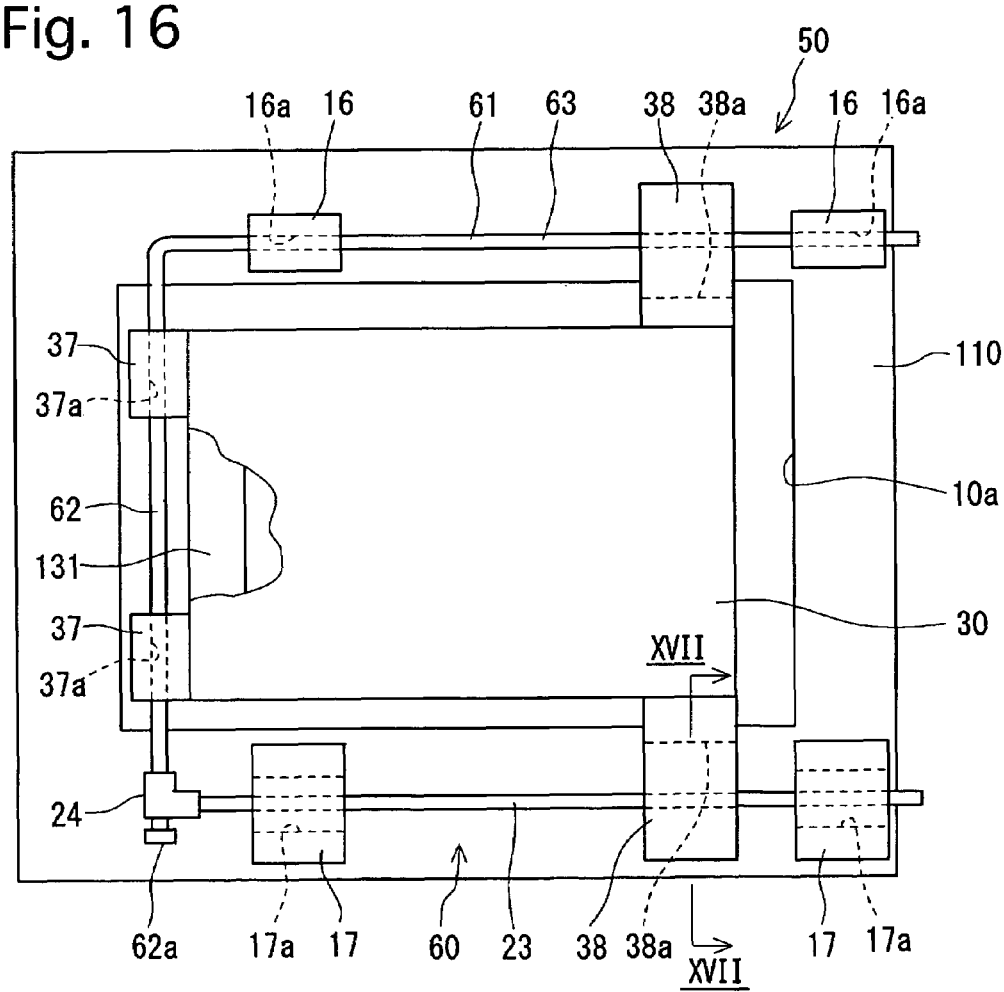
FIG. 16 is a rear elevational view of a second embodiment of the camera shake correction apparatus in an inoperative state, wherein an electric circuit board, two yoke members and magnets are not shown for clarity.

A second embodiment of the camera shake correction apparatus according to the present invention will be hereinafter discussed with reference to FIG. 16. Elements of the second embodiment of the camera shake correction apparatus 50 which are similar to those of the first embodiment of the camera shake correction apparatus 5 are designated by the same reference numerals, and are not discussed in the following description for the sake of simplicity.

The difference between the first embodiment of the camera shake correction apparatus and the second embodiment of the camera shake correction apparatus is in the structure of the stage apparatus, specifically in the Y-direction movable member, the X-direction movable member and a support structure of the stationary support plate for supporting the X-direction movable member.

The characteristic structure of the second embodiment of the camera shake correction apparatus will be discussed hereinafter.

A stationary support plate 110, which corresponds to the stationary support plate 10, is provided, on a rear surface of the stationary support plate 110 in the vicinity of the upper end thereof, with a pair of X-direction guide portions 16 which project rearward to be laterally spaced from each other. The pair of X-direction guide portions 16 are provided with a pair of X-direction guide holes 16*a*, respectively, which are formed as through-holes extending in the X-direction to be aligned in the X-direction. The stationary support plate 110 is provided, on a rear surface thereof in the vicinity of the lower end of the stationary support plate 110, with a pair of X-direction support portions 17 which project rearward to be laterally spaced from each other, and the pair of X-direction support portions 17 are provided with a pair of Y-direction elongated holes 17*a*, respectively, which are formed as through-holes extending in the X-direction to be aligned in the X-direction. Both a common axis of the pair of X-direction guide holes 16*a* and a common axis of the pair of Y-direction elongated holes 17*a*, which extend in the X-direction, lie on a common plane parallel to the stationary support plate 110.

The camera shake correction apparatus 50 is provided with an X-direction movable member 60 having substantially the same shape (substantially U shape) as the Y-direction movable member 20 provided in the first embodiment of the camera shake correction apparatus 5. The X-direction movable member 60 is provided with an L-shaped rod portion 61 made of metal and an X-direction rod portion 23 provided as a member independent of the L-shaped rod portion 61. The L-shaped rod portion 61 is made of a metal rod which is bent in the form of a substantially letter L. An end (lower end as viewed in FIG. 16) of the L-shaped rod portion 61 and an end (left end as viewed in FIG. 16) of the X-direction rod portion 23 are joined to each other by a joint 24. The left end of the X-direction rod portion 23 is fitted into an X-direction bottomed hole 24*b* of the joint 24 to be fixed thereto so as not to rotate relative to the joint 24 in a manner similar to that in the first embodiment of the camera shake correction apparatus (see FIG. 15). Since the L-shaped rod portion 61 is provided with a Y-direction rod portion 62 and an X-direction rod portion 63, since the lower end of the Y-direction rod portion 62 is fitted in a Y-direction through-hole 24*a* of the joint 24 to be rotatable relative thereto, and since a retainer disk 62*a* is fixed to the lower end of the Y-direction rod portion 61 in a state where the lower end of the Y-direction rod portion 61 is inserted into the Y-direction through-holes 24*a* of the joint 24 in a manner similar to that in the first embodiment of the camera shake correction apparatus, the X-direction rod portion 23 is rotatable relative to the Y-direction rod portion 62 about the axis thereof.

Figure 17:
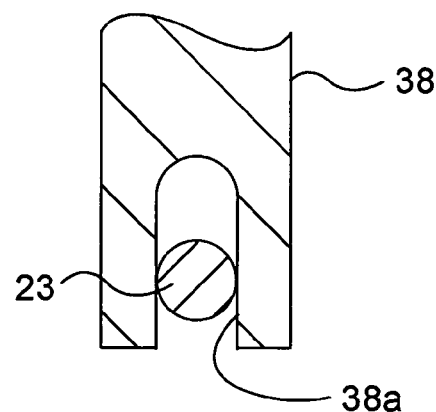
FIG. 17 is a cross sectional view taken along XVII-XVII line shown in FIG. 16.

A cover member (an element of the Y-direction movable member) 131, which corresponds to the cover member 31 of the first embodiment, is provided on a left side surface thereof with a pair of Y-direction guide portions 37 which project leftward from the cover member 131. The pair of Y-direction guide portions 37 are provided with a pair of Y-direction guide grooves 37a formed as through-holes, respectively, which extend in the Y-direction to be aligned in the Y-direction. The cover member 131 is provided on upper and lower surfaces thereof with a pair of support portions (elements of the Y-direction movable member) 38 which project upward and downward, respectively. As shown in FIG. 17, each support portion 38 is provided with a support groove (rotation limit hole) 38a which is formed through the support portion 38 in the X-direction to have a cross sectional shape substantially the same as the cross sectional shape of the support groove 35a shown in FIG. 8. Just like the base plate 30 shown in FIG. 2 of the first embodiment, the base plate 30 is secured to a rear surface of the cover member 131. The circuit board 36, the two yoke members YX and YY, the battery B, the control circuit C, the camera shake detection sensor S, etc., are not shown in FIG. 16 for clarity, similar to that in FIG. 2. Additionally, although not shown in FIG. 16, the CCD image sensor 3 and the low-pass filter 32 are positioned in the cover member 131 in a manner similar to that in the first embodiment of the camera shake correction apparatus.

The stage apparatus shown in FIG. 16 that has the above described structure is assembled in the following manner. Firstly, in a state where the L-shaped rod portion 61 of the X-direction movable member 60 is disengaged from the joint 24, the X-direction rod portion 63 is made to pass through the pair of X-direction guide holes 16a of the pair of X-direction guide portions 16, the Y-direction rod portion 62 is inserted into the pair of Y-direction guide grooves 37a of the pair of Y-direction guide portions 37, and the support groove 38a of the upper support portion 38 is engaged with the X-direction rod portion 63 to make the stationary support plate 110, the L-shaped rod portion 61 and the cover member 131 (and the base plate 30) integral with one another. In addition, after the X-direction rod portion 23 is made to pass through the pair of Y-direction elongated holes 17a and the support groove 38a of the lower support portion 38, the L-shaped rod portion 61 and the X-direction rod portion 23 are joined to each other by the joint 24 while a retainer disk (retainer portion) 62a which corresponds to each retainer disk 21a shown in FIG. 15 is fixed to the lower end of the Y-direction rod portion 62 to complete the assembly of the stage apparatus shown in FIG. 16.

Since cross sectional shapes of the X-direction rod portion 63 and each X-direction guide hole 16a are substantially the same, the X-direction rod portion 63 can linearly move relative to the pair of X-direction guide portions 16 without rattling therein (i.e., in a steady manner). On the other hand, the X-direction rod portion 23 is movable in both the X-direction and the Y-direction relative to the pair of Y-direction elongated holes 17a because the diameter of the X-direction rod portion 23 is substantially the same as the width of each Y-direction-elongated through-hole 17a in the forward/rearward direction of the camera shake correction apparatus 50 and because the length of each Y-direction-elongated through-hole 17a in the Y-direction is greater than the diameter of the X-direction rod portion 23. Accordingly, the X-direction movable member 60 is prevented from rotating about the axis of the X-direction rod portion 63 to lie in an X-Y imaginary plane (not shown in FIG. 16) at all times which is parallel to the stationary support plate 110 because the X-direction rod portion 23 is engaged in the pair of Y-direction-elongated through-holes 17a.

Since the cross sectional shapes of each Y-direction guide groove 37a and the Y-direction rod portion 62 are substantially the same, since the diameter of each X-direction rod portion 23 and 63 is substantially the same as the width of the support groove 38a of the associated support portion 38 in the forward/rearward direction of the camera shake correction apparatus 50, i.e., in a direction perpendicular to the X and Y directions, and further since the length of each support groove 38a in the Y-direction is greater than the diameter of the associated X-direction rod portion 23 or 63, the Y-direction movable member (the base plate 30, the cover member 131, the pair of Y-direction guide portions 37 and the pair of support portion 38) is linearly movable in the Y-direction relative to the X-direction movable member 60 without rotating about the axis of the Y-direction rod portion 62, and the cover member 131 and the base plate 30 remain parallel to the X-Y imaginary plane P.

In the second embodiment of the camera shake correction apparatus 50, applying a driving force on the circuit board 36 in the X-direction via the X-direction actuator (the magnet MX, the X-direction yoke member YX and the X-direction drive coil CX) causes the X-direction movable member 60 to move in the X-direction relative to the stationary support plate 110, while applying a driving force on the circuit board 36 in the Y-direction via the Y-direction actuator (the magnet MY, the Y-direction yoke member YY and the Y-direction drive coil CY) causes the Y-direction movable member (the base plate 30, the cover member 131, the pair of Y-direction guide portions 37 and the pair of support portion 38) to move in the Y-direction relative to the X-direction movable member 60 to correct camera shake (i.e., to stabilize an object image which is to be photographed).

Similar to the Y-direction movable member 20 in the first embodiment of the camera shake correction apparatus 5, the X-direction movable member 60 in the second embodiment of the camera shake correction apparatus 50 can be easily made. Moreover, the L-shaped rod portion 61 and the X-direction rod portion 23 can be easily positioned a common plane by adjusting the rotational angle of the X-direction rod portion 23 relative to the L-shaped rod portion 61 because the X-direction rod portion 23 is rotatable relative to the L-shaped rod portion 61 about the axis of the Y-direction rod portion 62 via the joint 24. Therefore, the X-direction movable member 60 can move smoothly relative to the stationary support plate 110, and also the Y-direction movable member (the base plate 30, the cover member 131, the pair of Y-direction guide portions 37 and the pair of support portion 38) can move smoothly relative to the X-direction movable member 60, which achieves an improved operating characteristics of the camera shake correction apparatus 50 that uses the above described X-direction movable member 60.

Although the above discussion has been addressed to the above described first and second embodiments of the camera shake correction apparatuses, the present invention is not limited solely to these particular embodiments. Various changes can be made in the above described first and second embodiments of stage apparatuses. For instance, it is possible for the Y-direction movable member 20 provided in the first embodiment to be modified to have the same structure as the X-direction movable member 60 provided in the second embodiment, or for the X-direction movable member 60 provided in the second embodiment be modified to have the same structure as the Y-direction movable member 20 provided in the first embodiment.

Additionally, in the camera shake correction apparatus 5 shown in FIG. 2, the retainer disks 21a can be omitted if the opposite ends of the Y-direction rod portion 21 can remain engaged with the upper and lower joints 24, respectively, during movement of the Y-direction movable member 20. Likewise, in the camera shake correction apparatus 50 shown in FIG. 16, the retainer disk 62a can be omitted if the lower end of the Y-direction rod portion 62 can remain engaged with the joint 24 during movement of the X-direction movable member 60.

Additionally, each joint 24 can be replaced by an alternative joint member as long as it can join one end of the Y-direction rod portion (21 or 62) to the associated end of the X-direction rod portion 22 or 23 so as to be relatively rotatable with respect to the alternative joint member. Furthermore, the Y-direction rod portion (21 or 62) can be fixed to a joint member without rotating relative thereto while each X-direction rod portion 22 and 23 can be engaged into the joint member to be relatively rotatable thereto, or both the Y-direction rod portion (21 or 62) and each X-direction rod portion 22 and 23 can be engaged into a joint member to be relatively rotatable about their respective axes.

Figure 18:
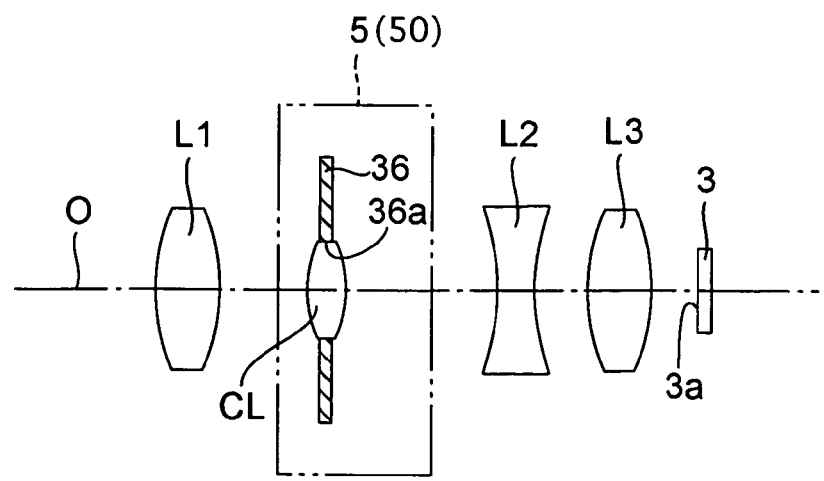
FIG. 18 is a schematic view of a modified embodiment of the present invention applied to an internal portion of a digital camera.

Although the CCD image sensor 3 is secured to the circuit board 36 which is moved in the X and Y directions to compensate camera shake in each of the above illustrated first and second embodiments of the camera shake correction apparatuses, it is possible to arrange the CCD image sensor 3 behind the stationary support plate (10 or 110) and to form a circular mounting hole 36a (see FIG. 18) in the circuit board 36 so that a correction lens CL (see FIG. 18) is fitted and secured to the mounting hole 36a and is arranged between the lenses L1 and L2 (or alternatively between the lenses L2 and L3). Even in this case, camera shake can be corrected by linearly moving the correction lens CL in the X and Y directions. Furthermore, such a camera shake correction apparatus using the correction lens CL can be applied to a silver-halide film camera by omitting the CCD image sensor 3.

In addition to the foregoing, although the yoke members YX and YY (and the magnets MX and MY) are provided on the stationary support plate (10 or 110) while the X-direction drive coil CX and the Y-direction drive coil CY are provided on the circuit board 36 in each of the first and second embodiments of the camera shake correction apparatus, it is possible to provide the X-direction drive coil CX and the Y-direction drive coil CY on the stationary support plate (10 or 110) and to provide the yoke members YX and YY (and the magnets MX and MY) on the circuit board 36.

Moreover, the X-direction actuator that consists of the magnet MX, the yoke member YX and the X-direction drive coil CX can be replaced by an alternative type of actuator, and the Y-direction actuator that consists of the magnet MY, the yoke member YY and the Y-direction drive coil CY can be replaced by an alternative type of actuator.

Although the above discussion has been addressed to several embodiments of stage apparatuses applied to the camera shake correction apparatus 5 or 50, the application of the stage apparatus according to the present invention is not limited thereto. The invention can be variously applied to an apparatus in which a movable stage is linearly moved in the X and Y directions.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stage apparatus comprising:
    a stationary support plate;
    a Y-direction movable member supported on, and parallel to, said stationary support plate so as to be relatively movable in a Y-direction, said Y-direction movable member including a Y-direction rod portion and a pair of X-direction rod portions, wherein said Y-direction rod portion extends in said Y-direction, and wherein said pair of X-direction rod portions are joined to said Y-direction rod portion to extend in an X-direction both parallel to said stationary support plate and perpendicular to said Y-direction; and
    an X-direction movable member supported by said pair of X-direction rod portions to be movable in said X-direction relative to said Y-direction movable member,
    wherein at least one of said pair of X-direction rod portions is rotatable about an axis of said Y-direction rod portion relative to said Y-direction rod portion.

2. The stage apparatus according to claim 1, wherein said stationary support plate comprises:
    at least one Y-direction guide portion having a Y-direction guide hole in which said Y-direction rod portion is slidably engaged to be guided in said Y-direction; and
    a pair of free-end support portions having a pair of Y-direction elongated holes, respectively, in which free ends of said pair of X-direction rod portions are engaged to be freely movable in said Y-direction and which prevents said pair of X-direction rod portions from rotating about said Y-direction rod portion, respectively.

3. The stage apparatus according to claim 1, wherein said X-direction movable member comprises:
    at least one X-direction guide portion having an X-direction guide hole in which one of said pair of X-direction rod portions is engaged so that said X-direction guide portion is linearly guided in said X-direction; and
    at least one support portion having a rotation limit hole in which the other of said pair of X-direction rod portions is engaged so that said support portion is movable in said X-direction relative to said other of said pair of X-direction rod portions without rotating about said one of said pair of X-direction rod portions.

4. The stage apparatus according to claim 1, wherein said Y-direction rod portion and at least one of said pair of X-direction rod portions are provided as separate members which are joined to each other via a joint so that said one X-direction rod portion is rotatable about said axis of said Y-direction rod portion.

5. The stage apparatus according to claim 4, wherein said joint has at least one support hole in which at least one of said pair of X-direction rod portions and said Y-direction rod portion is engaged to be rotatable relative to said joint.

6. The stage apparatus according to claim 5, wherein said support hole is formed as a through-hole which extends through said joint;
    wherein one end portion of said one of said pair of X-direction rod portions and said Y-direction rod portion extends through said joint through said support hole; and
    wherein a retainer member having a diameter greater than an inner diameter of said through-hole is fixed to an end of said one end portion which projects out of said through-hole.

7. The stage apparatus according to claim 1, further comprising:
    a Y-direction actuator which drives said Y-direction movable member in said Y-direction; and
    an X-direction actuator which drives said X-direction movable member in said X-direction.

8. The stage apparatus according to claim 7, wherein said stage apparatus is incorporated in a camera, wherein said camera comprises:
an image pickup device fixed to a front surface of said X-direction movable member so that an image pickup surface of said image pickup device is located on an image plane of a photographing optical system of said camera;
a camera shake detection sensor which detects camera shake of said camera; and
a controller for driving at least one of said Y-direction actuator and said X-direction actuator in accordance with said camera shake detected by said camera shake detection sensor to stabilize an object image which is formed on said image pickup device through said photographing optical system.

9. The stage apparatus according to claim 7, wherein said stage apparatus is incorporated in a camera,
wherein said camera comprises:
a correction lens fixed to said X-direction movable member to be positioned in front of an image plane of a photographing optical system of said camera, wherein an optical axis of said correction lens substantially coincides with an optical axis of said photographing optical system;
a camera shake detection sensor which detects camera shake of said camera; and
a controller for driving at least one of said Y-direction actuator and said X-direction actuator in accordance with said camera shake detected by said camera shake detection sensor to stabilize an object image which is formed on said image pick-up device through said photographing optical system and said correction lens.

10. The stage apparatus according to claim 4, wherein said joint comprises an L-shaped joint.

11. The stage apparatus according to claim 7, wherein each of said Y-direction actuator and said X-direction actuator comprises an electromagnetic actuator.

12. The stage apparatus according to claim 8, wherein said stationary support plate is positioned perpendicular to an optical axis of said photographing optical system.

13. The stage apparatus according to claim 9, wherein said stationary support plate is positioned perpendicular to said optical axis of said photographing optical system.

14. The stage apparatus according to claim 1, wherein said Y-direction movable member has a substantially U-shape.

15. The stage apparatus according to claim 3, wherein said rotation limit hole of said support portion is formed as a groove elongated in said X-direction through said support portion,
wherein a length of said groove in said Y-direction is greater than a diameter of said other of said pair of X-direction rod portions, and
wherein a width of said groove in a forward/rearward direction of said stage apparatus is substantially the same as said diameter of said other of said pair of X-direction rod portions.

16. A stage apparatus comprising:
a stationary support plate;
an X-direction movable member supported on, and parallel to, said stationary support plate so as to be relatively movable in an X-direction, said X-direction movable member including a pair of X-direction rod portions and a Y-direction rod portion, wherein said pair of X-direction rod portions extend in said X-direction, and wherein said Y-direction rod portion is joined to said pair of X-direction rod portions and extends in a Y-direction both parallel to said stationary support plate and perpendicular to said X-direction; and
a Y-direction movable member supported by said pair of X-direction rod portions to be movable in said Y-direction relative to said X-direction movable member,
wherein at least one of said pair of X-direction rod portions is rotatable about an axis of said Y-direction rod portion relative to said Y-direction rod portion.

17. The stage apparatus according to claim 16, wherein said stationary support plate comprises:
at least one X-direction guide portion having an X-direction guide hole in which one of said pair of X-direction rod portions is slidably engaged to be guided in said X-direction; and
at least one support portion having a Y-direction elongated hole in which the other of said pair of X-direction rod portions is engaged to be freely movable in said X-direction and which prevents said other of said pair of X-direction rod portions from rotating about said one of said pair of X-direction rod portions.

18. The stage apparatus according to claim 16, wherein said Y-direction movable member comprises:
at least one Y-direction guide portion having a Y-direction guide hole in which said Y-direction rod portion is engaged so that said Y-direction guide portion is linearly guided in said Y-direction; and
at least one support portion having a rotation limit hole in which at least one of said pair of X-direction rod portions is engaged so that said support portion is movable in said Y-direction relative to said one of said pair of X-direction rod portions without rotating about said Y-direction rod portion.

19. The stage apparatus according to claim 16, wherein said Y-direction rod portion and at least one of said pair of X-direction rod portions are provided as separate members which are joined to each other via a joint so that said one X-direction rod portion is rotatable about said axis of said Y-direction rod portion.

20. The stage apparatus according to claim 19, wherein said joint has at least one support hole in which at least one of said pair of X-direction rod portions and said Y-direction rod portion is engaged to be rotatable relative to said joint.

21. The stage apparatus according to claim 20, wherein said support hole is formed as a through-hole which extends through said joint;
wherein one end portion of said one of said pair of X-direction rod portions and said Y-direction rod portion extends through said joint through said support hole; and
wherein a retainer member having a diameter greater than an inner diameter of said through-hole is fixed to an end of said one end portion which projects out of said through-hole.

22. The stage apparatus according to claim 16, further comprising:
a Y-direction actuator which drives said Y-direction movable member in said Y-direction; and
an X-direction actuator which drives said X-direction movable member in said X-direction.

23. The stage apparatus according to claim 22, wherein said stage apparatus is incorporated in a camera,
wherein said camera comprises:
an image pickup device fixed to a front surface of said Y-direction movable member so that an image pickup surface of said image pickup device is located on an image plane of a photographing optical system of said camera;
a camera shake detection sensor which detects camera shake of said camera; and a controller for driving at least one of said Y-direction actuator and said X-direction actuator in accordance with said camera shake detected by said camera shake detection sensor to stabilize an object image which is formed on said image pickup device through said photographing optical system.

24. The stage apparatus according to claim 22, wherein said stage apparatus is incorporated in a camera, wherein said camera comprises:

a correction lens fixed to said Y-direction movable member to be positioned in front of an image plane of a photographing optical system of said camera, wherein an optical axis of said correction lens substantially coincides with an optical axis of said photographing optical system;

a camera shake detection sensor which detects camera shake of said camera; and a controller for driving at least one of said Y-direction actuator and said X-direction actuator in accordance with said camera shake detected by said camera shake detection sensor to stabilize an object image which is formed on said image pick-up device through said photographing optical system and said correction lens.

* * * * *